United States Patent
Challener et al.

(10) Patent No.: US 7,412,596 B2
(45) Date of Patent: Aug. 12, 2008

(54) METHOD FOR PREVENTING SYSTEM WAKE UP FROM A SLEEP STATE IF A BOOT LOG RETURNED DURING THE SYSTEM WAKE UP CANNOT BE AUTHENTICATED

(75) Inventors: David Carroll Challener, Raleigh, NC (US); Daryl Carvis Cromer, Apex, NC (US); Joseph Wayne Freeman, Raleigh, NC (US); Steven Dale Goodman, Raleigh, NC (US); James Patrick Hoff, Raleigh, NC (US); Howard Jeffrey Locker, Cary, NC (US); Randall Scott Springfield, Chapel Hill, NC (US); James Peter Ward, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 405 days.

(21) Appl. No.: 10/967,760

(22) Filed: Oct. 16, 2004

(65) Prior Publication Data

US 2006/0085630 A1    Apr. 20, 2006

(51) Int. Cl.
*G06F 9/00* (2006.01)
*G06F 15/177* (2006.01)
(52) U.S. Cl. .......................................................... 713/2
(58) Field of Classification Search ...................... 713/2
See application file for complete search history.

(56) References Cited

U.S. PATENT DOCUMENTS

| | | | |
|---|---|---|---|
| 5,875,345 A * | 2/1999 | Naito et al. ................. | 713/323 |
| 6,121,962 A * | 9/2000 | Hwang ........................ | 345/211 |
| 6,499,102 B1 | 12/2002 | Ewertz | |
| 6,523,133 B2 | 2/2003 | Shin'ichi et al. | |
| 6,571,341 B1 | 5/2003 | Forbes | |
| 6,725,384 B1 | 4/2004 | Lambino et al. | |
| 2003/0018923 A1 | 1/2003 | Kumar et al. | |
| 2003/0074590 A1 * | 4/2003 | Fogle et al. ................. | 713/320 |
| 2003/0149866 A1 * | 8/2003 | Neuman et al. ............. | 713/1 |
| 2003/0172313 A1 | 9/2003 | Jain et al. | |
| 2003/0188113 A1 | 10/2003 | Grawrock et al. | |
| 2003/0196111 A1 | 10/2003 | Lampson et al. | |
| 2004/0015694 A1 | 1/2004 | Detreville | |
| 2004/0030744 A1 * | 2/2004 | Rubin et al. ................. | 709/203 |
| 2004/0039946 A1 | 2/2004 | Smith et al. | |
| 2004/0064457 A1 | 4/2004 | Zimmer et al. | |
| 2004/0117625 A1 | 6/2004 | Grawrock | |

* cited by examiner

*Primary Examiner*—Rehana Perveen
*Assistant Examiner*—Mohammed H Rehman
(74) *Attorney, Agent, or Firm*—Carlos Munoz-Bustamante; Dillon & Yudell LLP

(57) ABSTRACT

A method and system for enabling security attestation for a computing device during a return from an S4 sleep state. When the computing device enters into the S4 state following a successful boot up, the attestation log is appended to the TPM tick count and the log is signed (with a security signature). When the device is awaken from S4 state, the BIOS obtains and verifies the log created during the previous boot. The CRTM maintains a set of virtual PCRs and references these virtual PCRs against the log. If the values do not match, the return from S4 state fails and the device is rebooted.

17 Claims, 2 Drawing Sheets

METHOD FOR PREVENTING SYSTEM WAKE UP FROM A SLEEP STATE IF A BOOT LOG RETURNED DURING THE SYSTEM WAKE UP CANNOT BE AUTHENTICATED

BACKGROUND OF THE INVENTION

1. Technical Field

The present invention relates generally to data processing systems and in particular to security features of data processing systems. Still more particularly, the present invention relates to a method and system for enhancing security of data processing systems when the system returns from a sleep state.

2. Description of the Related Art

The need for increased security of data processing systems and other computing platforms led to the formation of the Trusted-Computing Group (TCG) (formerly Trusted Computing Platform Alliance (TCPA)), which is dedicated to improving such system (computing platform) security. One innovation provided by TCG was Trusted Platform Module (TPM), which is a separate piece of hardware designed to provide confidence in system security, from power-up to shutdown. TPM provides core security services to the rest of a computing platform. In addition to TPM, TCG also provides software-level support for the security protocol via Core Root of Trust for Measurement (CRTM). Those skilled in the art are familiar with TCG and the utilization of TPMs and CRTM. A general overview of the group and security features may be found at Internet site www.trustedcomputinggroup.org.

While TPM-designed systems are secure, there are currently some usability/manageability/security issues with the usage of a TPM. One of these issues that has been identified is the inability of TCG compliant systems to securely return from the S4 sleep state while keeping the secured data within the TPM coherent. The current design philosophy is for the TCG compliant BIOS to clear the data within the TPM upon a S4 wake. This solves the security issues but creates usability issues since the user must reload all of the key material before an effective resume from a low power state can be accomplished.

S4 sleep state is one of several power-down states of a computing system that is provided within the advanced configuration and power interface (ACPI) specification. ACPI is also known to those skilled in the art. Specific information about the specification may be found at Internet site http://www.acpi.info/DOWNLOADS/ACPIspec20.pdf.

Specifically, S4 refers to a "suspend to disk" mode, wherein the computer system enters into a partial power-down mode or hibernation mode by passing boot control to a disk connected to the computer system. According to an advanced configuration and power interface (ACPI) specification, a computer system has to store current configuration data of the computer system in a hard disk (or other storage medium) when the computer system is in an S4 state so that the computer system can quickly boot again after the computer system is shut down. Furthermore, when the computer system is in an S4 state, the computer system is going to shut down and may break off the electric power. The computer system, therefore, has to transfer all data temporarily stored in the memory back to the hard disk drive in order to maintain the data.

When the computing system is initially powered on, the system boots to an operating system (Windows OS for example) and the platform configuration registers (PCRs) within the TPM are correctly and successfully extended. When the system later goes into S4 sleep state, a possible attack scenario exists if the hard drive is replaced with a Linux S4 sleep image. If the PCR's are not re-initialized, the system, when it is awaken, would have incorrect PCR values. This could lead to an attack on the user data protected by the PCR's. To protect against this attack, the current TCG PC Specific Specification requires the BIOS to re-initialize the PCR's on a S4 boot. This now creates usability problems since all of the application programs must load/unload data in the TPM on the S4 transitions. This is especially unattractive on mobile systems since the transitions to a S4 state can occur without user knowledge depending on the state of the battery.

The TCG PC specification requires that all PCRs should be reset during a wake event from S4 state. The result is that attestation and S4 are mutually exclusive. If any data is sealed to an OS, this data will not be available if the system ever enters S4 state. The present invention thus recognizes that it would be desirable to have a method and system that provides security when a computing platform returns from the S4 state. That is, a method and system that enables attestation with S4 state in a TPM computing platform would be a welcomed advancement.

SUMMARY OF THE INVENTION

Disclosed is a method and system for enabling security attestation for a computing device during a return from an S4 sleep state. When the computing device enters into the S4 state following a successful boot up, the attestation log has the TPM tick count appended and the log is signed (with a security signature). When the device is awaken from S4 state, the BIOS obtains and verifies the log created during the previous boot. The Core Root of Trust for Measurement (CRTM) maintains a set of virtual PCRs and references these virtual PCRs against the log. If the values do not match, the return from S4 state fails and the device is rebooted.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and system for enabling security attestation for a computing device during a return from an S4 sleep state. When the computing device enters into the S4 state following a successful boot up, the TPM tick count is appended onto the attestation log and the log is signed (with a security signature). When the device is awaken from S4 state, the BIOS obtains and verifies the log created during the previous boot. The CRTM maintains a set of virtual PCRs and references these virtual PCRs against the log. If the values do not match, the return from S4 state fails and the device is rebooted.

Figure 1:
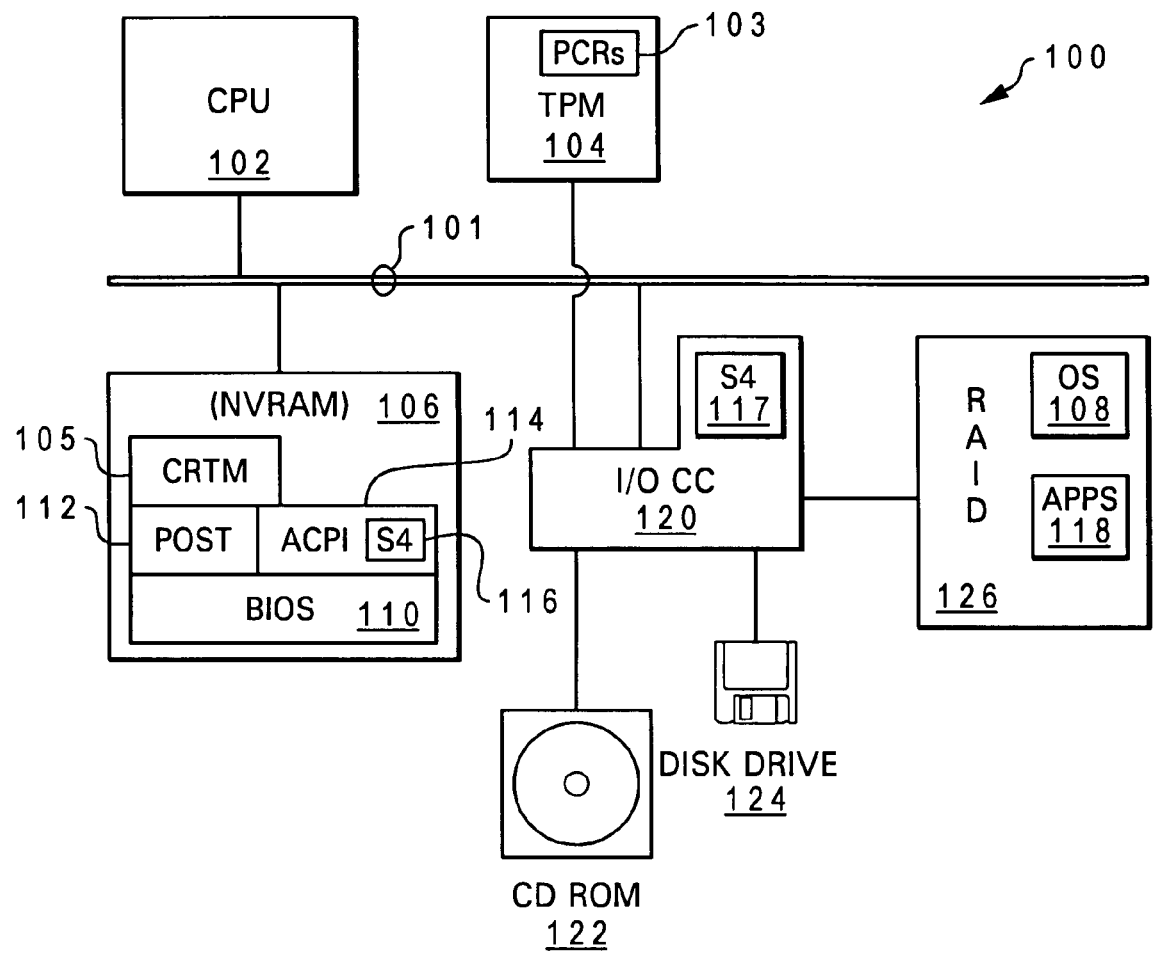
FIG. 1 is a block diagram representation of an exemplary data processing system within which the features of the invention may advantageously be implemented.

With reference now to the figures, and in particular FIG. 1, there is illustrated an exemplary embodiment of a computing device (or data processing system) within which the features of the invention may advantageously be implemented. Computing device 100 is a TCG compliant system configured with standard TCG compliant devices and logic. TCG refers to the Trusted Computing Group, which has promulgated a specification and operating protocol to provide security for computer devices so that the devices may be considered trusted resources. TCG and the promulgated protocols, etc. are described in detail at internet site: www.trustedcomputing-group.org, relevant content of which is hereby incorporated by reference. Several enhancements have been made to the existing TCG security protocol to enable system attestation during a return from S4 state.

Computing device 100 comprises central processing unit (CPU) (or processor) 102. Computing device 100 also includes non volatile memory 106, illustrated as non-volatile random access memory (NVRAM), within which is stored a number of firmware and software components that implement several of the functional features of the invention. Among these components internal to the non-volatile memory 106 are basic input output system (BIOS) 110, with associated Power-On Self Test (POST) code 112. In addition to these components, non volatile memory 106 is also configured with Core Root of Trust for Measurement (CRTM) code 105. CPU 102 and non volatile memory 106 are linked together via system interconnect 101.

Non-volatile memory 106 includes advanced configuration and power interface (ACPI) functions 114. The ACPI specification is described at Internet site http://www.acpi-.info/DOWNLOADS/ACPIspec20.pdf, relevant content of which is hereby incorporated by reference. ACPI functions 114 includes software control logic required for each of the various off/sleep modes, e.g., S1, S2, S3, S4, S5, of which S4 logic 116 is of particular interest and therefore illustrated.

Computing device 100 also comprises Input/Output channel controller (I/OCC) 120 coupled to interconnect 101. I/OCC 120 provides control features for various input and output devices, including CDROM 122 and disk drive 124. Notably, Hardware control for S4 state (S4 logic 117) is resident in I/OCC 120. During S4 hibernation, computing device 100 appears off (because the hardware is completely off), and the system memory is saved to a disk, such as hard disks 126. I/OCC 120 also provides access control for hard disks 124/126 illustrated as a random array of insignificant disks (RAID) system. Resident within hard disks 126 are operating system (OS) 108, which may be a Windows OS (or Linux), and program application 118.

Finally, also connected to I/OCC 120 is a trusted platform module (TPM) 104, which along with CRTM 105 enables TCG compliance features for the device. These TCG compliance features have been enhanced by the processes of the present invention. According to TCG specification, a number of platform configuration registers (PCRs) 103 are located within TPM 104.

It should be noted that the various components and specific configuration provided by FIG. 1 is provided solely for illustration and not meant to imply any limitation on the actual data processing system within which the features of the invention are applied/implemented. For example, while non volatile memory is shown with a particular set of logic and software components, these components may be housed at different locations of the computing device other than the non-volatile memory. Finally, while the access control to the hard drive is shown as being a single I/OCC 120 which controls each of the illustrated "disk-type" volatile memory devices, separate controllers may exist for the particular memory devices. Each of the above examples illustrates that the invention is not tied to a particular device configuration and that no limitations are to be inferred from the configuration illustrated and described herein for any one of the drawings.

Figure 2:
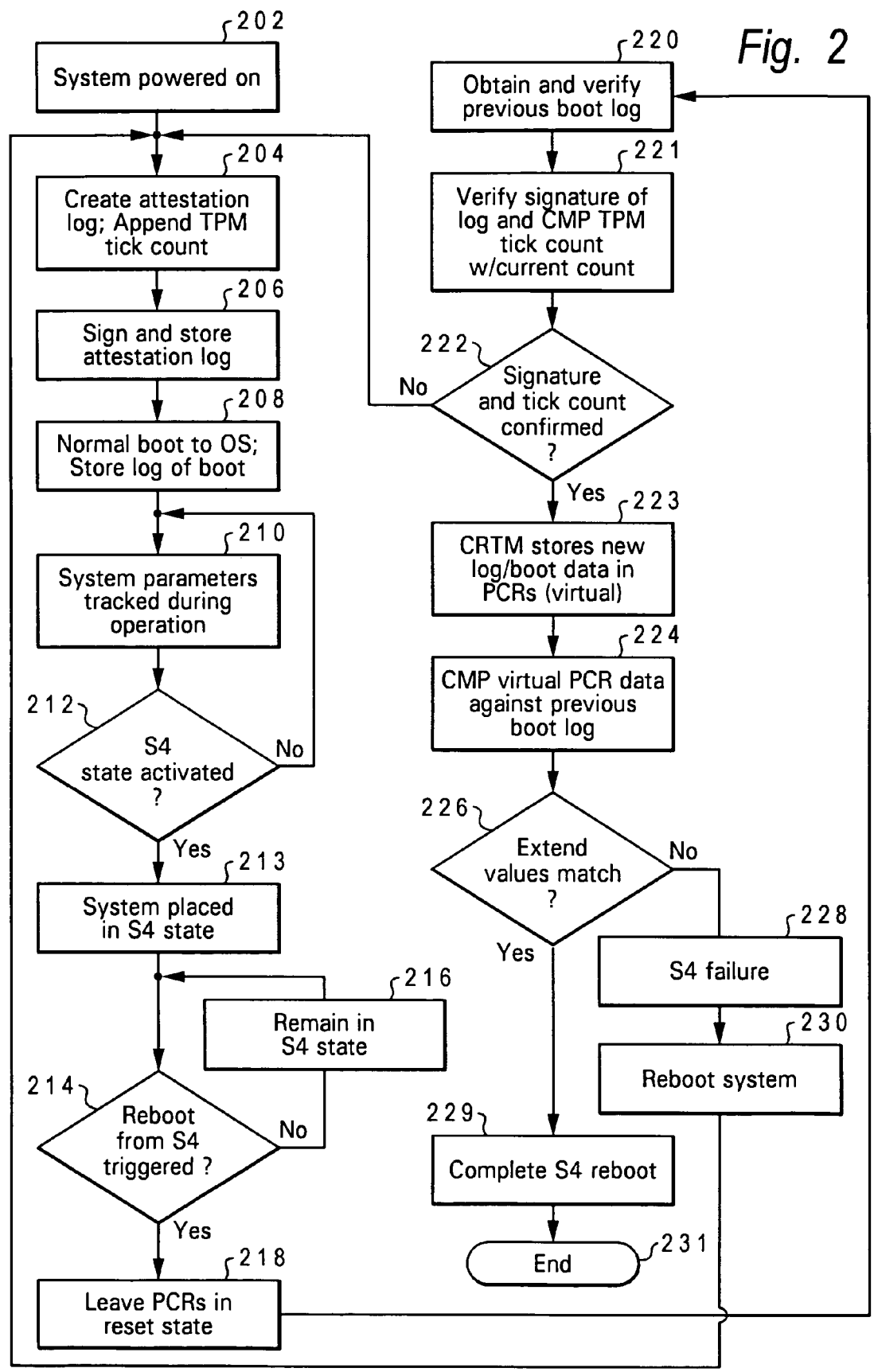
FIG. 2 is a flow chart illustrating the boot-level processing of the data processing system prior to and subsequent to going into the S4 state in accordance with one embodiment of the invention.

Turning now to FIG. 2, there is illustrated a flow chart of the process by which the attestation during a return from S4 state is completed according to one embodiment of the invention. The process begins at block 202 at which the computing device 100 is initially powered on. Following the power-on, an attestation log is created by the BIOS during pre-boot, and the TPM tick count is read and appended to the log at block 204. The attestation log is then signed at block 206. Signing the attestation log is completed via some secure signature generation process of the TPM, in one embodiment. This log will be used by the trusted bios on return from S4. Following the generation and signing of the attestation log, the log is stored until a re-boot is initiated from the S4 state Computing device then 100 undergoes a normal boot to the OS during which a log is generated and stored by the OS, as indicated at block 208. System parameters are tracked by the TPM during device operation as shown at block 210. In standard operation, the TPM saves the current state at run time. The TPM has a backup battery power supply so that whenever the device's power is removed, the current state information is saved across boot cycles.

The ACPI logic of the computing device determines at block 212 when the S4 state is triggered/activated for the device 100. If the S4 state is activated, the system is placed in the S4 state in which the hardware is completely off and system memory is saved to a disk, as indicated at block 213. Then, as illustrated at block 214, a determination is made whether the computing device is triggered to reboot (awaken) from the S4 state. If not, the device remains in the S4 state, as shown by block 216. If the reboot from S4 has been triggered, however, the BIOS, aware that the reboot is from the S4 state, leaves the PCRs in a reset state at block 218. The BIOS then obtains the log of the previous boot and initiates a verification process with the log of the previous boot, as shown at block 220. First, as illustrated by block 221, the BIOS verifies the signature of the boot log an also verifies that the TPM tick count stored within the boot log is the same as the current tick count of the device. These determinations are completed at block 222, and the device is rebooted if the verification fails for either the signature or the TPM tick count.

Once the signature and TPM tick counts are verified, indicating that the hibernation log is the current hibernation log, the boot block of the CRTM stores newly generated boot log data in the virtual PCRs at block 222. Then, the newly generated boot log data (referred to hereinafter as extend values) in the PCRs are compared against the previous boot log values at block 224. A determination is made at block 226 whether the extend values in the virtual PCRs matches the values stored in the log of the previous boot. When the values match, indicating that no tampering has occurred with the hard drive storing the memory values, the S4 reboot is allowed to complete as shown at block 229. Then the process ends at block 231. However, if the values do not match, an S4 failure is recorded at block 228, and the system is completely rebooted as shown at block 230.

When the system is rebooted, a flag has been set (in step 230) which indicates that this is not a return from S4. The CRTM issue the existing command to clear all of the PCR's and the boot process follows the existing process whereby everything is measure new (as in box 204)

Thus, with the above implementations, a known "leak/loophole/shortcoming" failing in the current TCG architecture is resolved. Further, the resolution is completed without affecting the defined TCG hardware.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A Trusted-Computing Group (TCG) compliant computer system comprising:
   a trusted platform module (TPM) with a plurality of platform configuration registers (PCRs);
   Core Root of Trust for Measurement (CRTM) logic that, during a pre-boot phase following an initial powered on of the computer system, automatically generates a normal boot log of system parameters;
   attestation logic associated with the CRTM logic that appends a current TPM tick count to said normal boot log, and signs said normal boot log with a verification signature; and
   a hard disk that is utilized for storing boot control parameters utilized when the computer system is awaken from an S4 hibernation state;
   S4 logic for placing said computer system in an S4 hibernation state, wherein the boot control parameters are stored on said hard disk as a S4 boot log to be utilized during a later wake up from S4 state;
   verification logic that dynamically authenticates that an S4 boot log returned from the hard disk during a wake up from the S4 hibernation state is trustworthy; and
   a basic input/output system (BIOS) that controls a boot process for the computer system and, when the S4 boot log is authenticated, confirms that the values stored within the S4 boot log is the same as the values of the normal boot log that is automatically generated;
   wherein, the computer system is allowed to become operational from the S4 state only when the boot log is authenticated as trustworthy and the BIOS confirms the values of the S4 boot log are the same as values of the normal boot log.

2. The computer system of claim 1, wherein when the S4 boot log cannot be authenticated or the BIOS indicates that at least one value does not match, an S4 boot failure is registered and a full system boot is initiated.

3. The computer system of claim 1, wherein the verification logic is a component of the CMRT logic and the verification logic completes authentication of the S4 boot log by:
   verifying that a verification signature of the S4 boot log is the same as the verification signature appended to the normal boot log; and
   checking that the TPM tick count of the S4 boot log is the same as the TPM tick count from the normal boot log.

4. The computer system of claim 3, wherein failure of either the verifying process or the checking process results in the S4 boot log being declared untrustworthy and a complete reboot initiated before handover to the BIOS occurs.

5. The computer system of claim 3, further comprising:
   logic for retrieving the normal boot log from within the PCRs of the TPM at initiation of the wake up from S4 state.

6. The computer system of claim 1, further comprising:
   stopping the S4 wake up process when the verification logic deems the S4 boot log untrustworthy or the BIOS finds at least one discrepancy when comparing the values; and
   contemporaneously initiating a normal boot up of the computer system, wherein old PCR values are discarded and a new normal boot log is generated and signed.

7. The computer system of claim 1, wherein the S4 logic includes logic for:
   copying the S4 boot log from the stored boot parameters onto a pre-selected hard disk;
   maintaining the reset state of the PCRs during power down of the system's hardware components; and
   powering down the hardware components of the computer system;
   enabling the computer system to awaken without undergoing a normal boot operation, wherein the S4 boot log is provided.

8. The computer system of claim 1, wherein said verification logic is activated responsive to a trigger to wake up the computer system from S4 state.

9. The computer system of claim 8, wherein the CRTM generates virtual PCRs having the values of the PCRs within the TPM and said verification logic compares the signature, TPM tick count and values within the S4 boot log with values of the virtual PCRs generated by the CRTM to determine if the S4 boot log is trustworthy and enable a wake up from S4 state to full operating state to be completed.

10. A device configured as a Trusted-Computing Group (TCG) compliant system, comprising:
    Core Root of Trust for Measurement (CRMT) logic for automatically creating a normal boot log during pre-boot of the device following power-on;
    trust compliance logic associated with the CRMT logic that provides a verification signature for the normal boot log and appends a current trusted platform module (TPM) tick count to the normal boot log;
    a TPM with platform configuration registers (PCRs) therein for storing the normal boot log along with its signature and TPM tick count appended thereto;
    S4 logic for placing said device in hibernation state, wherein S4 boot parameters of the device, similar to the normal boot log, are stored on a hard disk and the hardware components of the device are shut down;
    attestation and verification logic that dynamically authenticates an S4 boot log returned dining a wake up from S4 state by attesting that the S4 boot log parameters are the same as the parameters of the normal boot log stored within the PCRs of the TPM.

11. The device of claim 10, wherein the attestation and verification logic includes logic for:
    comparing a verification signature of the S4 boot log with a verification signature of the normal boot log;

comparing the TPM tick count appended to the S4 boot log with the TPM tick count of the normal boot log; and passing a boot process to a BIOS when both the verification signature and TPM tick count are authenticated; and halting a wake up from S4 and initiating a re-boot when either said verification signature or said TPM tick count are not correct.

12. The device of claim 10, further comprising:

a BIOS having logic that, when the S4 boot log parameters have been authenticated as trustworthy, takes over control of the boot process, and performs a BIOS-level attestation process including:

comparing actual values of the S4 boot log against values of the normal boot log provided within virtual PCRs created by the CRTM;

when the values match, continuing an S4 boot process with the S4 boot log; and when at least one of the values does not match, halting the S4 boot process and initiating a complete re-boot of the device;

wherein, attestation of the computer system for reboot from the S4 state is only provided when the values match.

13. A method comprising:

in a computer system with a TPM, CRTM, BIOS, and S4 functionality, providing a verification signature to a normal boot log during a pre-boot process after power-on of the computer system;

appending a current trusted platform module (TPM) tick count to the normal boot log;

when the computer system is placed in an S4 state, storing a copy of the normal boot log parameters as an S4 boot log within a hard disk of the computer system;

when a return from S4 state is triggered, dynamically attesting that the S4 boot log is the correct S4 boot log for that computer system with that TPM before enabling an S4 boot of the computer system; and when the S4 boot log cannot be attested as the correct S4 boot log, failing the S4 boot of the computer system.

14. The method of claim 1, further comprising:

appending a TPM tick count to the normal boot log during said pre-boot process; and saving the normal boot log with the verification signature and TPM tick count within the TPM.

15. The method of claim 14, wherein said attesting comprises:

comparing a verification signature of the S4 boot log with a verification signature of the normal boot log; and comparing the TPM tick count appended to the S4 boot log with the TPM tick count of the normal boot log.

16. The method of claim 15, further comprising:

passing a boot process to a basic input output system (BIOS) when both the verification signature and TPM tick count are authenticated; and halting a wake up from S4 and initiating a re-boot when either said verification signature or said TPM tick count are not correct.

17. The method of claim 16, further comprising:

comparing actual values of the S4 boot log against values of the normal boot log provided within virtual PCRs created by the Core Root of Trust for Measurement (CRTM);

when the values match, continuing an S4 boot process with the S4 boot log; and when at least one of the values does not match, halting the S4 boot process and initiating the complete re-boot of the device.

* * * * *